US012596492B2

(12) United States Patent
Kachmar et al.

(10) Patent No.: US 12,596,492 B2
(45) Date of Patent: Apr. 7, 2026

(54) PERFORMING DATA-STORAGE BACKGROUND ACTIVITIES

(71) Applicant: Dell Products L.P., Round Rock, TX (US)

(72) Inventors: Maher Kachmar, Dearborn Heights, MI (US); Vladimir Shveidel, Pardes Hana-Karkur (IL); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/794,063

(22) Filed: Aug. 5, 2024

(65) Prior Publication Data

US 2026/0037166 A1 Feb. 5, 2026

(51) Int. Cl.
G06F 3/06 (2006.01)

(52) U.S. Cl.
CPC .......... G06F 3/0631 (2013.01); G06F 3/0604 (2013.01); G06F 3/0673 (2013.01)

(58) Field of Classification Search
CPC .... G06F 3/0631; G06F 3/0604; G06F 3/0673; G06F 3/0683; G06F 1/329
See application file for complete search history.

(56) References Cited

U.S. PATENT DOCUMENTS

| | | | | |
|---|---|---|---|---|
| 8,904,091 | B1* | 12/2014 | Guda ...................... | G06F 3/061 |
| | | | | 711/172 |
| 11,169,724 | B2 | 11/2021 | Jiang et al. | |
| 11,385,928 | B2 | 7/2022 | Vankamamidi et al. | |
| 11,468,012 | B2 | 10/2022 | Chinthekindi et al. | |
| 11,809,835 | B2 | 11/2023 | Shveidel et al. | |
| 2019/0265895 | A1* | 8/2019 | Okelberry ............. | G06F 3/0644 |
| 2024/0419365 | A1* | 12/2024 | Sharma ................. | G06F 3/0689 |
| 2025/0060991 | A1* | 2/2025 | Shveidel ............... | G06F 9/4881 |

OTHER PUBLICATIONS

Shveidel, Vladimir, et al.; "Background Maintenance Task Regulation and Scheduling," U.S. Appl. No. 18/450,051, filed Aug. 15, 2023.

* cited by examiner

*Primary Examiner* — Hiep T Nguyen
(74) *Attorney, Agent, or Firm* — BainwoodHuang

(57) ABSTRACT

A technique for performing data-storage background activities includes maintaining a plurality of queues of background activities for respective types of background activities. The queues have a specified order based on a set of relationships between the types of background activities. The technique further includes allocating respective numbers of resource units to respective queues of the plurality of queues. The technique still further includes executing batches of background activities from the respective queues in the specified order for the respective numbers of resource units.

19 Claims, 5 Drawing Sheets

300

| Global Scheduler Pipeline State | Status |
|---|---|
| Total BG Debt in Time (sec) | 5866 |
| Current Queue Cursor | RefCount Dec |
| Last-Cycle Pipeline Efficiency (%) | 56 |

400

410      420      430

| BQ Queues | No. of Resource Units (Cycles) | Pipeline Adjustment |
|---|---|---|
| TrashBin 250-A | 100 | Maintain |
| MergeBin 250-B | 100 | Maintain |
| Late Dedupe 250-C | 1000 | Increase |
| RefCount Dec 250-D | 1000 | Increase |
| Def. PhysUtil 250-E | 1000 | Decrease |
| Garbage Collection 250-F | 10 | Maintain |

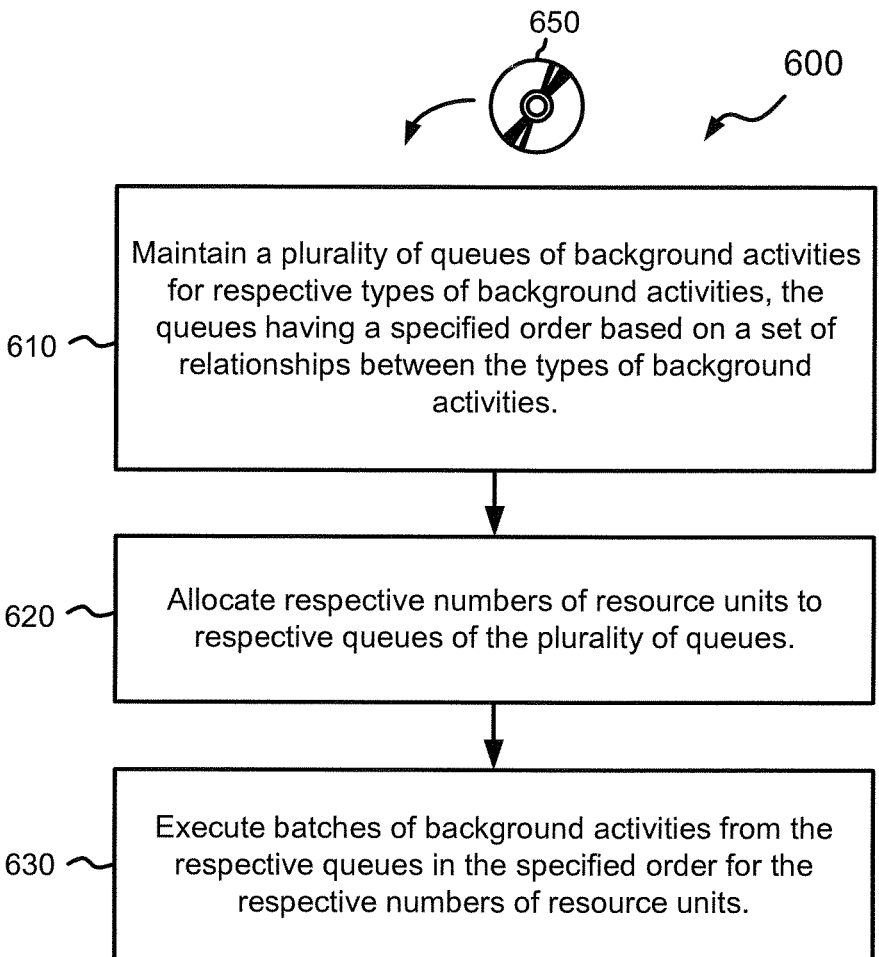

650

600

610 ～

Maintain a plurality of queues of background activities for respective types of background activities, the queues having a specified order based on a set of relationships between the types of background activities.

620 ～

Allocate respective numbers of resource units to respective queues of the plurality of queues.

630 ～

Execute batches of background activities from the respective queues in the specified order for the respective numbers of resource units.

FIG. 6

PERFORMING DATA-STORAGE BACKGROUND ACTIVITIES

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some data storage systems run background jobs to optimize storage utilization and functioning, or to complete activities started when responding to storage requests. For example, these data storage systems defer or otherwise limit computing resources allocated to running background jobs as to avoid interfering with I/O throughput. The data storage systems may increase processing of the background jobs when the I/O load is low and may decrease processing of background jobs when the I/O load is high.

SUMMARY

Data storage systems that perform background jobs continuously accumulate "background debt," i.e., deferred processing work. A previous approach to working through, or "paying," background debt has been to sequence background jobs from respective queues based on a queue priority. If multiple queues have the same priority, the data storage system cycles through those queues in an arbitrary order (e.g., round robin).

Unfortunately, arbitrarily cycling through queues of a given priority tends to involve unnecessary work and limits the effectiveness of background jobs. For example, a data storage system may unnecessarily run a background job on certain data, only to delete the same data in a background job that runs later. In another example, certain background jobs (e.g., garbage collection) produce less complete results if other background jobs have not been recently performed (e.g., decrementing reference counts to identify unused storage locations). The arbitrary ordering of background jobs thus limits how quickly and effectively background debt can be reduced. What is needed, therefore, is a more efficient way of reducing background debt.

The above need is addressed at least in part by an improved technique that leverages relationships between different types of background activities to increase an overall efficiency of executing background activities. Along these lines, a storage system provides various queues for respective types of background activities and arranges the queues in a specified order based on relationships between the respective types. The storage system further allocates respective resource units (e.g., time, cycles, jobs, etc.) to the queues for executing background activities. The storage system executes background activities from a particular queue for the queue's respective resource units, after which it executes background activities from the next queue in the specified order. Advantageously, later background activities can take advantage of work completed during earlier background activities.

Certain embodiments are directed to a method of performing data-storage background activities. The method includes maintaining a plurality of queues of background activities for respective types of background activities, the queues having a specified order based on a set of relationships between the types of background activities. The method further includes allocating respective numbers of resource units to respective queues of the plurality of queues. The method still further includes executing batches of background activities from the respective queues in the specified order for the respective numbers of resource units.

In some embodiments, executing the batches of background activities includes executing a first batch of background activities from a first queue of the plurality of queues prior to executing a second batch of background activities from a second queue of the plurality of queues. Executing the first batch of background activities affects background activities of the second batch of background activities.

In some embodiments, executing the first batch of background activities increases a number of background activities from the second queue that are completed in the respective number of resource units allocated to the second queue compared to an order in which the second queue precedes the first queue.

In some embodiments, the second batch of background activities queue is a batch of provided for garbage collection activities. In these embodiments, executing the first batch of background activities increases a number of free storage blocks that are available for the garbage collection activities compared to an order in which the second queue precedes the first queue.

In some embodiments, a third queue of the plurality of queues is arranged to have certain activities therein executed in parallel with the first queue and before the second queue in the specified order. In these embodiments, executing the batches of background activities further includes executing a third batch of background activities from the third queue simultaneously with executing the first batch of background activities from the first queue and before executing the second batch of background activities from the second queue. Executing the third batch of background activities affects the background activities of the second batch of background activities.

In some embodiments, the resource units are periods of time, CPU cycles, or background jobs. The background jobs aggregate background activities.

In some embodiments, the method further includes monitoring performance of background processing based on one or more performance metrics of the plurality of queues. Further, the method includes, after executing the batches of background activities, reallocating the respective numbers of resource units based on the monitored performance and executing additional batches of background activities from the respective queues in the specified order using the reallocated numbers of resource units.

In some embodiments, monitoring the performance of background processing includes obtaining (i) a first performance metric from executing a first batch of background activities of a first type and (ii) a second performance metric from executing a second batch of background activities of a second type. The first performance metric and the second performance metric reflect characteristics specific to the first type and the second type, respectively. In these embodiments, a global performance value is generated based on at least the first performance metric and the second performance metric.

In some embodiments, reallocating the respective numbers of resource units includes adjusting a number of resource units allocated to a particular queue of the plurality of queues based on a performance metric of another queue of the plurality of queues.

In some embodiments, monitoring the performance of the background processing includes obtaining a reduction in background debt that results from executing the batches of background activities. Reallocating the respective numbers of resource units includes adjusting one or more of the respective numbers of resource units based on the reduction in background debt.

In some embodiments, monitoring the performance includes obtaining a number of reclaimed storage blocks that results from executing the batches of background activities. Reallocating the respective numbers of resource units includes adjusting one or more of the respective numbers of resource units based on the number of reclaimed blocks.

In some embodiments, executing the batches of background activities includes executing a first batch of background activities of a first type, the first batch of background activities acting upon a plurality of logical addresses identified in a first queue; and after executing the batch of background activities of the first type on the plurality of logical addresses, executing a second batch of background activities of a second type, the second batch of background activities acting upon the same plurality of logical addresses.

In some embodiments, the queues of the plurality of queues have a common priority.

In some embodiments, the method further includes requeuing a group of background activities from one or more of the queues into a higher-priority queue having a higher priority than the common priority. In such embodiments, background activities from the higher-priority queue are executed separately from the specified order.

Other embodiments are directed to a computerized apparatus constructed and arranged to perform a method of performing data-storage background activities, such as the method described above. Still other embodiments are directed to a computer program product. The computer program product stores instructions which, when executed on control circuitry of a computerized apparatus, cause the computerized apparatus to perform a method of performing data-storage background activities, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 6 is a flowchart showing an example method of performing data-storage background activities.

DETAILED DESCRIPTION

Embodiments of the improved technique will now be described. One should appreciate that such embodiments are provided by way of example to illustrate certain features and principles but are not intended to be limiting.

An improved technique leverages relationships between different types of background activities to increase an overall efficiency of executing background activities. Along these lines, a storage system provides various queues for respective types of background activities and arranges the queues in a specified order based on relationships between the respective types. The storage system further allocates respective resource units (e.g., time, cycles, jobs, etc.) to the queues for executing background activities. The storage system executes background activities from a particular queue for the queue's respective resource units, after which it executes background activities from the next queue in the specified order. Advantageously, later background activities can take advantage of work completed during earlier background activities.

Figure 1:
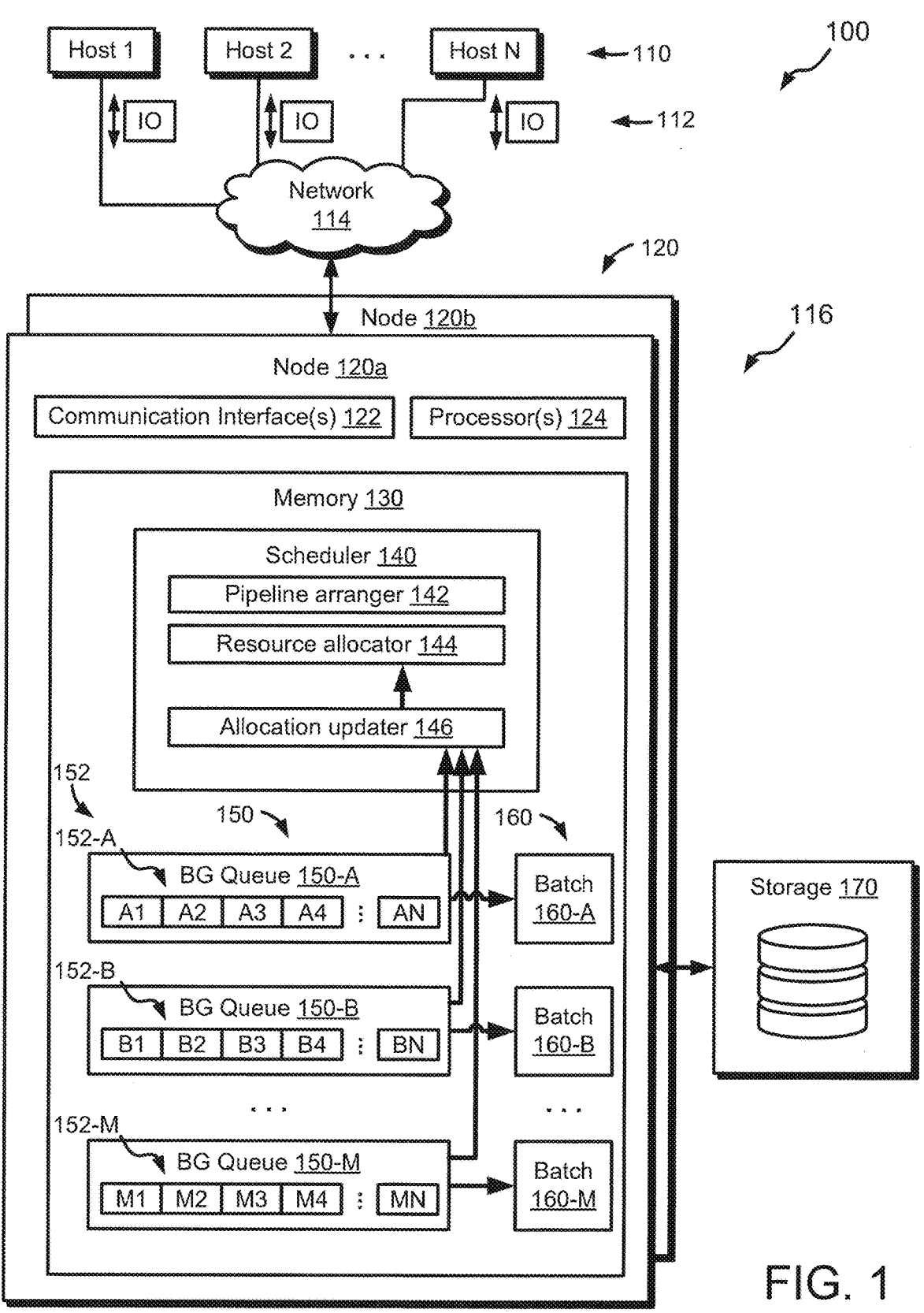
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 170, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, ISCSI (Internet small computer system interface), NVMeOF (Non-volatile Memory Express (NVMe) over Fabrics), NFS (network file system), and CIFS (common Internet file system), for example. As is known, Fibre Channel, ISCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 170.

The depiction of node 120*a* is intended to be representative of all nodes 120. As shown, node 120*a* includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120*a*. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a scheduler 140 and multiple background (BG) queues 150, e.g., background queues 150-A through 150-M.

The scheduler 140 is constructed and arranged to manage the background queues 150. The scheduler 140 includes a pipeline arranger 142, a resource allocator 144, and an allocation updater 146.

The pipeline arranger 142 is configured to arrange the background queues 150 in a specified order. In some embodiments, the specified order is based on a set of relationships between different types of background activities for which the background queues 150 are provided.

For example, suppose that a first queue is provided for snapshot-deletion activities and a second queue is provided for pointer-merge activities. In this embodiment, the pipeline arranger 142 may arrange the first queue of snapshot-deletion activities before the second queue of pointer-merge activities. This order takes advantage of a beneficial relationship between these operations to maximize efficiency. That is, the snapshot-deletion activities may reduce work to be performed during the pointer-merge activities, as the pointer-merge activities can avoid having to merge pointers of deleted snapshots.

It should be appreciated that the opposite order may not provide the same benefits. That is, performing the pointer-merge activities before the snapshot-deletion activities may unnecessarily merge pointers of snapshots that are subsequently deleted. As a result, this opposite order results in unnecessary work, inhibiting a rate at which a storage system can reduce background debt.

The resource allocator 144 is constructed and arranged to allocate resources for executing background activities from respective background queues of the background queues 150. In some embodiments, the resource allocator 144 designates a respective number of resource units to each of the background queues 150. Non-limiting examples of resource units include periods of time, numbers of CPU cycles, and numbers of background jobs.

The allocation updater 146 is constructed and arranged to monitor performance of background processing based on one or more performance metrics of the background queues 150. Non-limiting examples of performance metrics include an amount of work completed, an amount of storage blocks freed through garbage collection, and a reduction in background debt. The allocation updater 146 is further constructed and arranged to direct the resource allocator 144 to reallocate resources to the background queues 150 based on the monitored performance.

The background queues 150 arrange background activities 152 (e.g., background activities 152-1 through 152-M). In some embodiments, each of the background queues 150 are provided for a respective type of background activity.

In some embodiments, the background queues 150 include respective job managers (not shown). The job managers are constructed and arranged to communicate with each other and/or with the scheduler 140 to coordinate the execution of background activities. In some embodiments, the job managers are further constructed and arranged to provide performance metrics to the allocation updater 146.

In example operation, the data storage system 116 executes batches 160 (e.g., batches 160-A through 160-M) of the background activities 152 from the background queues 150. In some embodiments, each of the background queues 150 provides background activities for a respective batch 160. For example, the background queue 150-A provides background activities 152-A in the batch 160-A, the background queue 150-B provides background activities 152-B in the batch 160-B, and so forth. In some embodiments, the data storage system 116 executes each of the batches 160 in one or more respective background jobs that aggregate background activities.

In executing the background jobs, the data storage system 116 identifies a first background queue (e.g., 150-A) in the specified order of the background queues 150. The data storage system 116 then executes background activities from the first background queue for the number of resource units allocated to the first background queue.

After executing the first batch of background activities, the data storage system 116 continues on to a second background queue (e.g., 150-B) in the specified order and executes background activities from the second background queue for the number of resource units allocated to the second background queue. This process continues until the data storage system 116 proceeds through the remaining background queues 150 in the specified order. In some embodiments, the data storage system 116 repeatedly cycles through the specified order to complete background activities.

Further, in some embodiments, the data storage system 116 reallocates the numbers of resource units allocated to the background queues 150. Along these lines, in such embodiments, the allocation updater 146 monitors performance of background processing (e.g., the execution of the batches 160). Based on the monitored performance, the allocation updater 146 directs the resource allocator 144 to reallocate the numbers of resource units. In some embodiments, the resource allocator 144 reallocates the numbers of resource units at predefined periods, e.g., after proceeding through the specified order for a predefined number of times, after a predefined time period, etc. In some embodiments, reallocating the numbers of resource units includes increasing, decreasing, or maintaining one or more of the numbers of resource units for the respective background queues 150.

Advantageously, reallocating the numbers of resource units enables the data storage system 116 to adjust the execution of background activities to maximize efficiency of the background queues 250.

Figure 2:
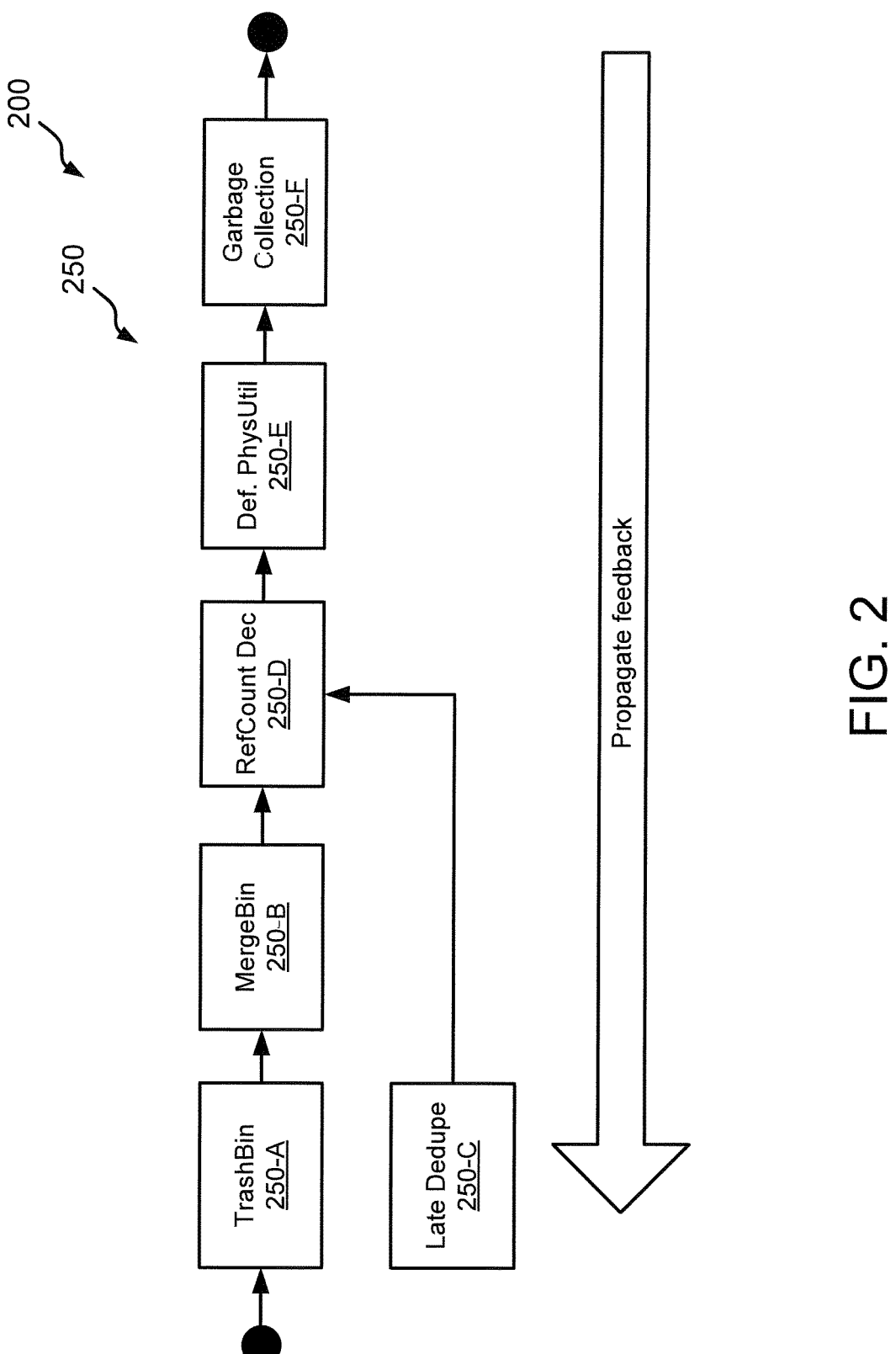
FIG. 2 is a block diagram showing an example order in which background queues are arranged.

FIG. 2 shows an example order 200 in which background queues 250 are arranged. As described in greater detail below, each of the background queues 250 is provided for a respective type of background activity. In some embodiments, the background queues 250 have a common priority.

It should be understood that the depicted background queues 250 are provided merely for illustration. In some embodiments, the specified order includes a different number of background queues, background queues provided for different types of background activities, and so forth.

In the example shown, background queue 250-A includes snapshot-deletion activities that delete old snapshots in the data storage system 116. A snapshot is a point-in-time version of a data object, such as a LUN, a file system, a virtual machine disk, or the like. Like other data objects, some snapshots include pointers that refer directly or indirectly to data. In some embodiments, older snapshots are regularly flagged for deletion, for example, according to a snapshot policy.

Background queue 250-B includes pointer-merge activities to merge pointers. For example, suppose a first pointer refers to a second pointer that refers to data. In this case, a pointer-merge activity could modify the first pointer to instead refer directly to the data, rather than the second pointer. As a result, the pointer-merge activity reduces the number of pointers needed to access data, increasing access speeds.

Background queue 250-C includes late-deduplication activities. Deduplication refers to a technique of replacing redundant data with pointers to already stored copies of the same data. In this manner, deduplication improves storage efficiency. Late deduplication, as opposed to inline deduplication, occurs out-of-band from I/O activities.

Background queue 250-D includes reference-count decrement (decref) activities to decrement reference counts of shared storage blocks. Along these lines, in some embodiments, logical blocks of various files or volumes point to virtual blocks, which in turn point to physical blocks where data is stored. Because of block sharing, multiple logical blocks may point to the same virtual block. Each virtual block may have a reference count, which counts the number of logical blocks that point to it. A reference count for a virtual block may be incremented in response to copies, new snapshots, and the like, and it may be decremented in response to deletes, for example. Once the reference count for a virtual block reaches zero, the associated physical block is no longer being used and the space occupied by the physical block can be reclaimed.

Background queue 250-E includes deferred physical-utility activities to indicate unused data blocks. Along these lines, in some embodiments, the data storage system 116 organizes multiple data blocks into a physical large block (PLB). Each PLB contains a descriptor (e.g., a header or footer) containing a summary of the data blocks in the PLB. Over time, data blocks in a PLB may become unused, i.e., have a reference count of zero. Nevertheless, the data blocks are not otherwise designated as unused until the data storage system 116 updates the descriptor of the PLB. In some embodiments, the data storage system 116 updates the descriptor after accumulating a predefined number of unused data blocks.

Background queue 250-F includes garbage-collection activities to reorganize data stored in a storage system.

Along these lines, in some embodiments, a storage system writes data in units of PLBs. Over time, some data in a PLB becomes stale, i.e., is no longer used. That is, a PLB may contain a mix of both valid (used) and invalid (unused) data, providing a so-called "partly filled" PLB. Garbage collection collects valid data from multiple partly filled PLBs and combines the valid data into a new PLB. The partly filled PLBs are then freed to store other data. One measure of garbage collection efficiency is a ratio of freed PLBs to new PLBs (e.g., 2:1, 4:1, etc.).

During example operation, the data storage system 116 executes batches of background activities from the background queues 250 according to the specified order 200. The data storage system 116 spends a number of resource units allocated to a respective background queue before moving on to the next background queue in the specified order 200. For example, the data storage system 116 spends a first number of resource units executing a first batch of background activities from the background queue 250-A. Then, the data storage system 116 spends a second number of resource units executing a second batch of background activities from the background queue 250-B, and so on.

In some embodiments, executing background activities from an earlier queue increases a rate at which background activities can be completed from a later queue. For example, suppose that the data storage system 116 executes a batch of snapshot-deletion activities from the background queue 250-A to remove a set of snapshots. In that case, subsequent pointer-merge activities from the background queue 250-B can avoid work that involves the removed set of snapshots. As a result, the data storage system 116 can focus its pointer-merge activities on still-relevant work, improving a rate at which the data storage system 116 reduces background debt.

In some embodiments, executing background activities from an earlier queue increases the effectiveness of background activities executed from a later queue. For example, suppose that the data storage system 116 executes a batch of decref activities in which the data storage system 116 reduces a set of reference counts to zero, indicating storage locations that are no longer being used. As a result, the data storage system 116 has better (less filled) candidate storage locations for garbage collection, thus enabling the data storage system 116 to produce more free PLBs using a given number of resources, improving garbage-collection efficiency.

In some embodiments, multiple background queues 250 are arranged for execution in parallel. For example, as further shown in FIG. 2, the background queue 250-C is disposed in parallel with both the background queue 250-A and the background queue 250-B. In this case, the data storage system 116 executes background activities from the background queue 250-C simultaneously with executing the background queue 250-A and/or the background queue 250-B.

It should be understood that the background queues 250-A through 250-C all precede the background queue 250-D in the specified order 200. Thus, the data storage system 116 performs background activities from the background queues 250-A through 250-C prior to executing background activities from the background queue 250-D.

In some embodiments, the allocation updater 146 receives feedback (e.g., performance metrics) indicating the efficiency in which the data storage system 116 executes background activities from the background queues 250. In some embodiments, the type of background activity affects the type of performance metrics obtained from executing a given batch of background activities. For example, the performance of deferred physical-utility activities may be based on how many data blocks are designated as unused when updating a descriptor of a PLB. In contrast, the performance of garbage-collection activities may be based on a number of PLBs freed in garbage collection. In this manner, the performance metrics reflect characteristics specific to the respective types of background activity. Based on the performance metrics, the allocation updater 146 directs the resource allocator 144 to reallocate resources allocated to the background queues 250.

In some embodiments, the resource allocator 144 adjusts a number of resource units allocated to a particular queue based on a performance metric of a different queue. For example, suppose that the background queue 250-B (containing pointer-merge activities) has suboptimal performance. In that case, the resource allocator 144 may increase a number of resource units allocated to the background queue 250-A (containing snapshot-deletion activities). This reallocation results in an increase in a number of snapshots deleted in a given pass, which increases a number of storage locations for which the pointer-merge activities can avoid merging pointers. In this manner, the resource allocator 144 leverages the relationship between the background queues 250-A and 250-B to increase the performance of the background queue 250-B.

Figure 3:
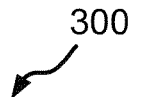
FIG. 3 is a table of a current status of a pipeline.

FIG. 3 shows an example table 300 providing a point-in-time status of the data storage system 116. In some embodiments, the scheduler 140 maintains the table 300.

The table 300 identifies a total estimated background debt, i.e., deferred processing work. As shown, the background debt is quantified in units of processing time, e.g., seconds. However, background debt may be quantified in other ways, e.g., background activities, background jobs, CPU cycles, etc.

The table 300 further identifies a current background queue from which the data storage system 116 is executing background activities. For example, the table 300 includes a current queue cursor that identifies a decref queue, e.g., background queue 250-D.

The table 300 further identifies the last cycle pipeline efficiency from progressing through the specified order 200. In some embodiments, the last-cycle pipeline efficiency is a global performance value generated based on performance metrics of the background queues 250. In some embodiments, the last-cycle pipeline efficiency is based on a reduction in background debt from the previous run through the specified order 200. In some embodiments, the last-cycle pipeline efficiency is based on a number of reclaimed (or freed) PLBs from the previous run. Using the last-cycle pipeline efficiency, the resource allocator 144 can adjust resources allocated to the background queues 250. In some embodiments, however, reallocation is based on individual performance metrics of individual queues, or on a combination of the last-cycle pipeline efficiency and the individual performance metrics.

Figure 4:
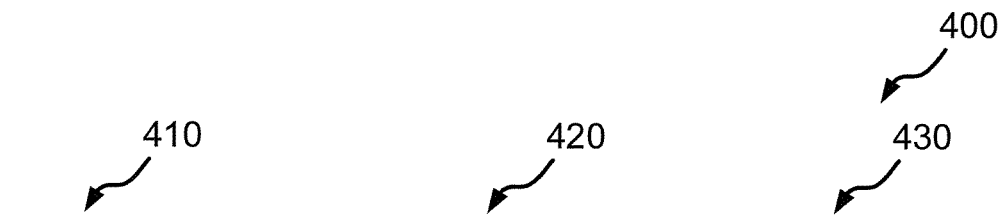
FIG. 4 is a table of resource allocation and adjustment for various background queues.

FIG. 4 shows an example table 400 indicating allocation of resource units to the respective background queues 250. The table 400 includes columns 410, 420, and 430. The column 410 identifies the background queues 250. The column 420 identifies respective numbers of resource units that the resource allocator 144 allocated to the background queues 250. For example, as shown, 100 cycles are allocated to the background queue 250-A, 10 cycles are allocated to the background queue 250-F, and so forth. However, it should be understood that the background queues and allocated resources are merely provided for illustration. In some embodiments, the table 400 includes different queues, different numbers of resource units, and so forth. Non-limiting examples of resource units include periods of time, CPU cycles, and background jobs. The column 430 indicates a reallocation of resources to the background queues 250. For example, as shown, the allocation updater 146 instructs the resource allocator 144 to increase, decrease, or maintain the respective numbers of resource units.

After reallocating the resources to the background queues 250, the data storage system 116 proceeds through the specified order 200, executing additional batches of background activities according to the reallocated resources.

Figure 5:
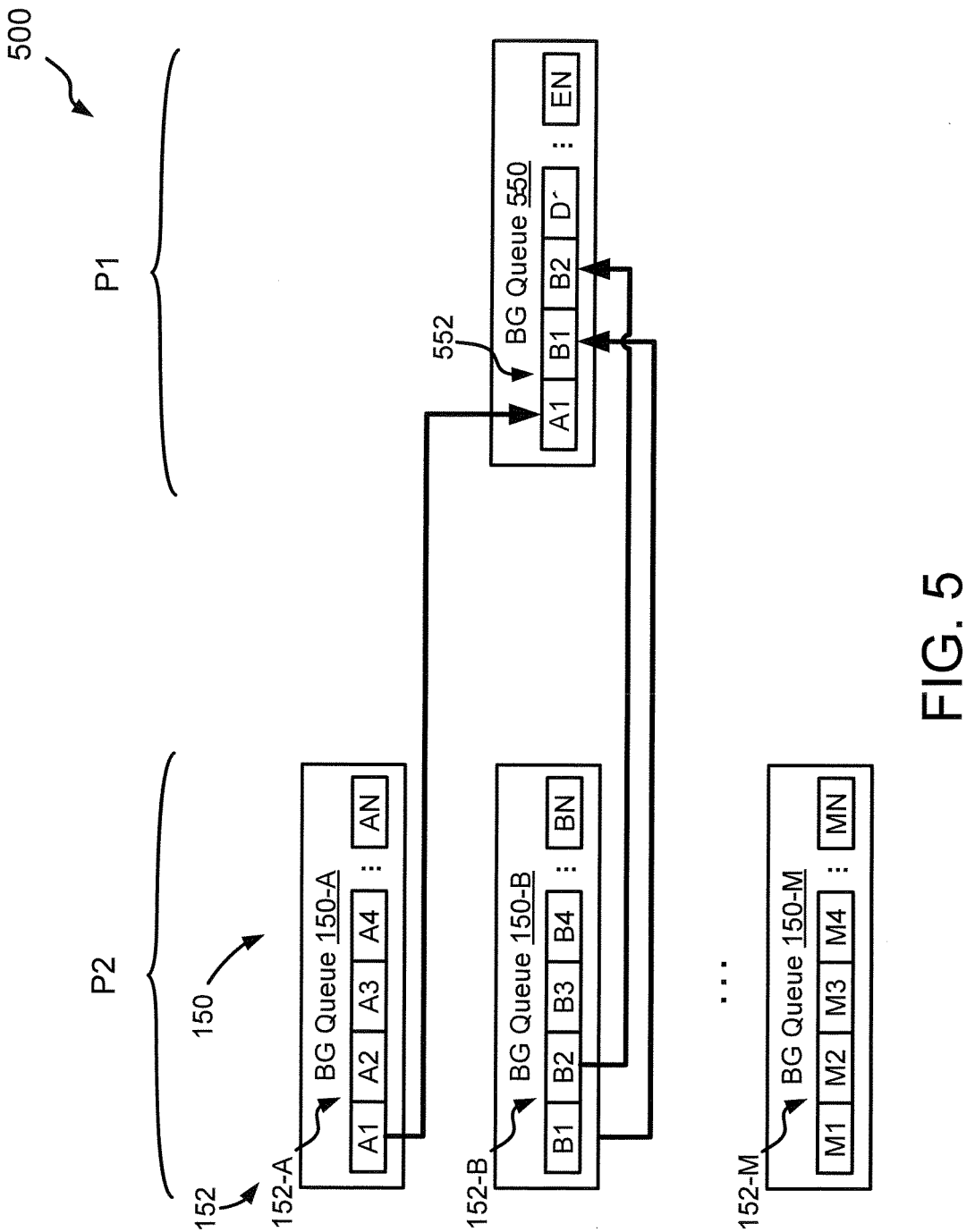
FIG. 5 is a block diagram showing an example arrangement in which background activities are transferred between background queues.

FIG. 5 shows an example 500 in which a group of background activities from one or more lower priority queues are requeued into a higher priority queue. As shown, background queues 150 have a lower priority P2, while a background queue 550 has a higher priority P1. In some embodiments, the background queue 550 is a residual critical queue from which the data storage system 116 executes background activities separately from the specified order 200.

In some embodiments, certain background activities of the background activities 152 of the background queues 150 are transferred to a new set of background activities 552 of the background queue 550. In this manner, the certain background activities may be executed out-of-order from the background activities remaining in the lower priority queues. Advantageously, the data storage system 116 can execute the certain background tasks more urgently, e.g., to free storage resources.

In some embodiments, some background activities (e.g., DI, EN, etc.) are inserted into the background queue 550 directly, rather than being transferred from a lower priority queue. For example, data-flush activities or RAID-rebuild activities be independently critical and executed separately from the specified order 200.

FIG. 6 shows an example method 600 that may be carried out in connection with the environment 100 and provides an overview of some of the features described above. The method 600 is typically performed, for example, by the software constructs described in connection with FIG. 1, which reside in the memory 130 of a node 120 and are run by the set of processors 124. The various acts of method 600 may be ordered in any suitable way. Accordingly, embodiments may be constructed in which acts are performed in orders different from that illustrated, which may include performing some acts simultaneously.

At 610, the data storage system 116 maintains a plurality of queues of background activities for respective types of background activities. The queues have a specified order 200 based on a set of relationships between the types of background activities.

At 620, the resource allocator 144 allocates respective numbers of resource units to respective queues of the plurality of queues, e.g., as shown in column 420 of table 400 (FIG. 4).

At 630, the data storage system executes batches of background activities from the respective queues in the specified order for the respective numbers of resource units.

In some examples, the method 600 may be embodied as a computer program product including one or more non-transient, computer-readable storage media 650, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

An improved technique has been described for performing data-storage background activities. The technique leverages relationships between different types of background activities to increase an overall efficiency of executing background activities. Along these lines, a storage system provides various queues for respective types of background activities and arranges the queues in a specified order based on relationships between the respective types. The storage system further allocates respective resource units (e.g., time, cycles, jobs, etc.) to the queues for executing background activities. The storage system executes background activities from a particular queue for the queue's respective resource units, after which it executes background activities from the next queue in the specified order. Advantageously, later background activities can take advantage of work completed during earlier background activities.

Having described certain embodiments, numerous alternative embodiments or variations can be made. For example, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Further, although the term "user" as used herein may refer to a human being, the term is also intended to cover non-human entities, such as robots, bots, and other computer-implemented programs and technologies. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of performing data-storage background activities, comprising:
   maintaining a plurality of queues of background activities for respective types of background activities, the queues having a specified order based on a set of relationships between the types of background activities;
   allocating respective numbers of resource units to respective queues of the plurality of queues; and
   executing batches of background activities from the respective queues in the specified order for the respective numbers of resource units.

2. The method of claim 1, wherein executing the batches of background activities includes:
   executing a first batch of background activities from a first queue of the plurality of queues prior to executing a second batch of background activities from a second queue of the plurality of queues, wherein executing the first batch of background activities affects background activities of the second batch of background activities.

3. The method of claim 2, wherein executing the first batch of background activities increases a number of background activities from the second queue that are completed in the respective number of resource units allocated to the second queue compared to an order in which the second queue precedes the first queue.

4. The method of claim 2, wherein the second queue is provided for garbage collection activities; and
   wherein executing the first batch of background activities increases a number of free storage blocks that are available for the garbage collection activities compared to an order in which the second queue precedes the first queue.

5. The method of claim 2, wherein a third queue of the plurality of queues is arranged to have certain activities therein executed in parallel with the first queue and before the second queue in the specified order; and
   wherein executing the batches of background activities further includes executing a third batch of background activities from the third queue simultaneously with executing the first batch of background activities from the first queue and before executing the second batch of background activities from the second queue, wherein executing the third batch of background activities affects the background activities of the second batch of background activities.

6. The method of claim 1, wherein the resource units are periods of time, CPU cycles, or background jobs, wherein the background jobs aggregate background activities.

7. The method of claim 1, further comprising:
   monitoring performance of background processing based on one or more performance metrics of the plurality of queues;
   after executing the batches of background activities, reallocating the respective numbers of resource units based on the monitored performance and executing additional batches of background activities from the respective queues in the specified order using the reallocated numbers of resource units.

8. The method of claim 7, wherein monitoring the performance of background processing includes:

obtaining (i) a first performance metric from executing a first batch of background activities of a first type and (ii) a second performance metric from executing a second batch of background activities of a second type, the first performance metric and the second performance metric reflecting characteristics specific to the first type and the second type, respectively; and generating a global performance value based on at least the first performance metric and the second performance metric.

9. The method of claim 7, wherein reallocating the respective numbers of resource units includes adjusting a number of resource units allocated to a particular queue of the plurality of queues based on a performance metric of another queue of the plurality of queues.

10. The method of claim 7, wherein monitoring the performance of the background processing includes obtaining a reduction in background debt that results from executing the batches of background activities, wherein reallocating the respective numbers of resource units includes adjusting one or more of the respective numbers of resource units based on the reduction in background debt.

11. The method of claim 7, wherein monitoring the performance includes obtaining a number of reclaimed storage blocks that results from executing the batches of background activities, wherein reallocating the respective numbers of resource units includes adjusting one or more of the respective numbers of resource units based on the number of reclaimed blocks.

12. The method of claim 1, wherein executing the batches of background activities includes:

executing a first batch of background activities of a first type, the first batch of background activities acting upon a plurality of logical addresses identified in a first queue; and after executing the batch of background activities of the first type on the plurality of logical addresses, executing a second batch of background activities of a second type, the second batch of background activities acting upon the same plurality of logical addresses.

13. The method of claim 1, wherein the queues of the plurality of queues have a common priority.

14. The method of claim 13, further comprising:

requeuing a group of background activities from one or more of the queues into a higher-priority queue having a higher priority than the common priority, background activities from the higher-priority queue executed separately from the specified order.

15. A computerized apparatus, comprising control circuitry that includes a set of processors coupled to memory, the control circuitry constructed and arranged to perform a method of performing data-storage background activities, the method including:

maintaining a plurality of queues of background activities for respective types of background activities, the queues having a specified order based on a set of relationships between the types of background activities;

allocating respective numbers of resource units to respective queues of the plurality of queues; and executing batches of background activities from the respective queues in the specified order for the respective numbers of resource units.

16. A computer program product including a set of non-transitory, computer-readable media having instructions which, when executed by control circuitry of a computerized apparatus, cause the computerized apparatus to perform a method of performing data-storage background activities, the method including:

maintaining a plurality of queues of background activities for respective types of background activities, the queues having a specified order based on a set of relationships between the types of background activities;

allocating respective numbers of resource units to respective queues of the plurality of queues; and executing batches of background activities from the respective queues in the specified order for the respective numbers of resource units.

17. The computer program product of claim 16, wherein executing the batches of background activities includes:

executing a first batch of background activities from a first queue of the plurality of queues prior to executing a second batch of background activities from a second queue of the plurality of queues, wherein executing the first batch of background activities affects background activities of the second batch of background activities.

18. The computer program product of claim 16, wherein the method further includes:

monitoring performance of background processing based on one or more performance metrics of the plurality of queues;

after executing the batches of background activities, reallocating the respective numbers of resource units based on the monitored performance and executing additional batches of background activities from the respective queues in the specified order using the reallocated numbers of resource units.

19. The computer program product of claim 18, wherein monitoring the performance of background processing includes:

obtaining (i) a first performance metric from executing a first batch of background activities of a first type and (ii) a second performance metric from executing a second batch of background activities of a second type, the first performance metric and the second performance metric reflecting characteristics specific to the first type and the second type, respectively; and generating a global performance value based on at least the first performance metric and the second performance metric.

\* \* \* \* \*